Dec. 13, 1949
R. C. FEAGIN
2,491,097
METHOD OF MAKING SYNTHETIC RESIN
ARTICLES SUCH AS TEETH
Filed Aug. 23, 1946
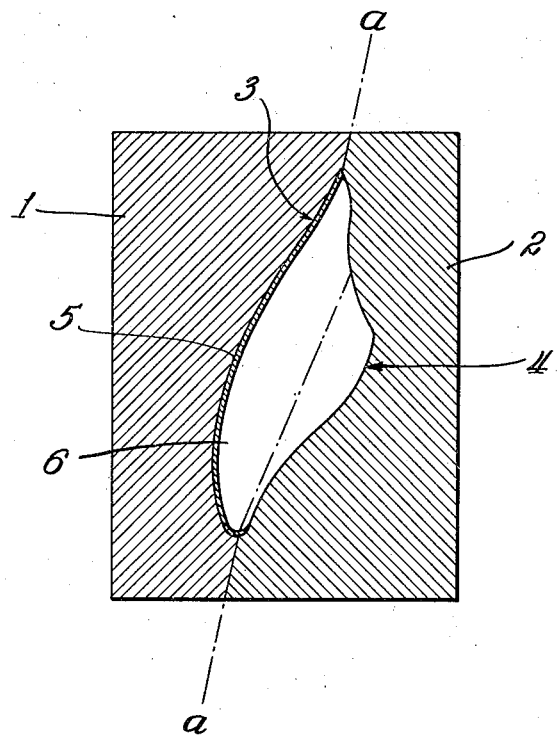
INVENTOR.
Roy C. Feagin
BY
Brown, Jackson, Boettcher & Dienner
Att'ys.

Patented Dec. 13, 1949

2,491,097

UNITED STATES PATENT OFFICE 2,491,097

METHOD OF MAKING SYNTHETIC RESIN ARTICLES SUCH AS TEETH

Roy C. Feagin, Flushing, N. Y., assignor to Austenal Laboratories, Incorporated, New York, N. Y., a corporation of New York Application August 23, 1946, Serial No. 692,584

4 Claims. (Cl. 18—55.1)

This invention relates, in general, to the art of making plastic or synthetic resin-like objects, and has particular relation to an improved method of making teeth of plastic or synthetic resin-like material.

In the past, various methods have been used for making plastic or synthetic resin-like teeth and other articles of plastic or synthetic resin-like material. In general, these methods are as follows:

1. Compression molding: this method uses two mold halves containing cavities into which powder is placed and subsequently heated to molding temperature. The two mold halves are then closed together by suitable pressure to produce the molded article.

2. Injection molding: according to this method the preheated plastic or synthetic resin-like material is injected under pressure into the mold cavity.

3. Transfer molding: in this method a plastic or synthetic resin-like pre-form is heated outside of the mold and then transferred to the mold cavity, after which the mold halves are closed together by means of suitable pressure to form the molded article. This method is used primarily for thermosetting materials.

4. Monomer-polymer molding: this method has been used in making dentures and artificial teeth, and is carried out by mixing polymerizable material with its polymer or other polymers to form a plastic dough. This dough is compressed into a mold cavity and is then cured under compression until the molded piece is hard or completely cured.

In the use of monomeric and polymeric methyl methacrylate, for example, the method has been carried out ordinarily and in general by preparing suitable plaster or plaster-like molds, pressing the dough mixture into these molds either for teeth, crowns, bridges, denture bases or the like, closing the molds with pressure, and placing them in water at suitable curing temperatures. With a monomer-polymer cure in metal molds a very great difficulty has been encountered in producing molded plastic or synthetic resin-like objects, such as teeth, particularly those having considerable bulk, without the molded objects containing localized shrink marks on the surface. These shrink marks produce inaccuracies and, in the case of teeth, produce teeth which do not have a satisfactory appearance, particularly where the localized shrink marks occur along the labial surface of the tooth. Where the localized shrink marks are along the incisal or cusp area the tooth will not function correctly.

One of the main objects of the present invention is to provide an improved method with which the problem heretofore encountered in producing molded plastic or synthetic resin-like objects, such as teeth, without localized shrink marks is eliminated; more particularly, an improved method with which plastic or synthetic resin-like teeth may be produced without localized shrink marks or other harmful effect on the appearance or functioning of the teeth.

Another object of the invention is to accomplish the new and advantageous results set forth by placing between the desired surface of the uncured tooth body and the adjacent surface of the mold cavity a film of a character to eliminate shrink marks on the surface of the tooth in curing the same, and curing the plastic or synthetic resin-like material against this film instead of curing it directly against the surface of the mold cavity.

Another and more specific object of the invention is to accomplish the new and advantageous results set forth in curing objects such as teeth formed of monomer-polymer material.

Another object of the invention is to provide a method of the character described, having the novelty and advantages set forth, and characterized by its simplicity and its economy and effectiveness in use for accomplishing the desired results.

Further objects and advantages of the invention will appear from the following detailed description, taken in connection with the accompanying drawing, in which the single figure is a vertical sectional view of one illustrative form of tooth mold showing the body of synthetic resin-like material in the mold cavity with a film, according to the present invention, between a surface of the body of synthetic resin-like material and the adjacent surface of the mold cavity.

Referring now to the drawing, the reference numerals 1 and 2 designate, generally, the two halves respectively of a metal tooth mold. The particular mold shown in the drawing is illustrative, and it is to be understood that the form and character of the mold may vary widely within the scope of the present invention.

The mold halves 1 and 2 selected for illustration have cavity portions 3 and 4 which, when the mold is closed, define a cavity for forming the desired plastic or synthetic resin-like object, such as a tooth. The mold cavity shown in the drawing is a cavity for forming an anterior tooth, but this is also merely illustrative, it being understood that the mold cavity may be of a configuration for forming a posterior tooth or other desired plastic or synthetic resin-like object. The mold halves 1 and 2 part along the dot and dash line a—a, but this also may vary.

In making teeth according to the present invention of a plastic or synthetic resin-like material comprising, for example, a monomer-polymer material, the polymerizable material is mixed with its polymer or other polymers to form a plastic dough. This dough is then placed in the mold cavity and between the mold halves 1 and 2 with a film 5 between a surface or surfaces of the body 6 of the monomer-polymer material, and the adjacent surface or surfaces of the mold cavity. The film 5 is shown between what is to form the labial surface of the tooth made of the body 6 of monomer-polymer material and the adjacent surface of the mold cavity. It may be placed between any one or more of the surfaces of the uncured tooth body 6 and the adjacent surface or surfaces of the mold cavity, for example, between one or more of the labial, incisal or cusp surfaces of the tooth body and the adjacent surface or surfaces of the mold cavity.

The film 5 may be formed of plastic film material of suitable thickness, for example of the order of about .001" to .005", against the desired surface or surfaces of the tooth. The film material 5 is composed of any suitable material which has the necessary strength and which can be made to conform to the mold cavity. It is particularly desirable to use a material which contains no constituent which is reacted upon by the plastic or synthetic resin-like material used in making the teeth. In other words, a plasticized film would not be as desirable for the manufacture of plastic or synthetic resin-like teeth as would a non-plasticized material, since the teeth have a tendency to extract some of the plasticizer from the film and to produce a surface which is not particularly desirable on a tooth. Such a surface is usually a faded surface and may have crow foot shrink marks thereon as well as lacking in the desired glossy appearance.

I have found that suitable film materials for use where the tooth is formed of methyl methacrylate are a non-plasticized Koroseal (polyvinyl chloride) cast film, a natural or synthetic rubber film, a polyvinyl alcohol film, polyethylene film, and a number of other film materials are contemplated for securing the desired results. Particularly I have found that a polyethylene film is very satisfactory for this particular application with methyl methacrylate since there is no solvent action of the methyl methacrylate on the film, and it is not softened even at curing temperatures of 100° C. It also has considerable gloss, and imparts this gloss to the tooth.

A natural rubber film has also been used to good advantage since it has very great strength and elasticity and conforms very readily to very great depressions in the mold. This material is also not dissolved by methyl methacrylate. The use of a synthetic rubber or rubber-like film is also contemplated.

I have also used other polymerizable materials such as vinyl acetate mixed with methyl methacrylate polymer without having any effect upon the film. This technique, therefore, will produce completely satisfactory results on any monomer-polymer molding material, provided the monomer portion has no solvent action on the film. Even if there is a slight solvent action, I still contemplate eliminating localized shrink marks, and, since modifications in the resinous material of the teeth are contemplated, I do not intend to be restricted to the use of a film against a methyl methacrylate composition alone, but with any polymerizable mixture of monomers or polymers or other materials.

After placing the tooth material 6 in the mold cavity with the film 5 of a character to eliminate shrink marks on the finished tooth or other object in place between the desired surface or surfaces of the uncured body 6 and the adjacent surface or surfaces of the mold cavity, the mold is closed with pressure and the body of plastic or synthetic resin-like material is cured, for example, by placing the mold in water at suitable curing temperatures. As already described, with a film 5 of polyethylene, such film is not softened even at curing temperatures of 100° C.

Although I do not intend to be limited to the theory of the action which takes place, and reserve the right to correct or change the theory if and when occasion requires, it seems that the use of a film 5 in accordance with this invention and of the character described prevents localized sticking of the body 6 of plastic or synthetic resin-like material to the surface of the mold cavity in curing the material and thereby localized shrink marks, fading of the color, or loss of gloss on the tooth or other object. In other words, if shrinkage of the body 6 occurs in curing the same, it is uniform over the surface of the body 6, and thereby shrink marks, fading of color, and loss of the desired glossy appearance are eliminated.

After curing of the tooth body 5 is completed, the mold is opened by separating the mold parts 1 and 2 and the cured tooth is removed from the mold cavity. The film 5 may then be stripped or otherwise removed from the tooth or from the mold cavity if it tends in anywise to remain in the mold cavity.

An example of a suitable composition for the making of plastic teeth by this method is as follows:

3 parts (by volume) methyl methacrylate polymer 1 part (by volume) methyl methacrylate monomer.

The material may be colored in both incisal and gingival shading, as desired. These materials are then mixed carefully to a doughy consistency, at which time they may be utilized in the pressing or injection molding of the suitable incisal and gingival portions of the tooth.

The embodiment of the invention shown in the drawing is for illustrative purposes only, and it is to be expressly understood that the drawing and the accompanying specification are not to be construed as a definition of the limits or scope of the invention, reference being had to the appended claims for that purpose.

I claim:

1. A method of producing an article of polymerizable material which comprises: placing a film of polyethylene between a body of such polymerizable material and a forming surface having a contour to be imparted to the article, shaping the body of polymerizable material in contact with said film and to the contour of said surface, and curing the polymerizable material while in contact with said film, said polymerizable material consisting essentially of an acrylic compound.

2. A method of producing an article of polymerizable material which comprises: placing a film of polyethylene between a body of such polymerizable material and a forming surface having a contour to be imparted to the article, shaping the body of polymerizable material in contact with said film and to the contour of said surface, and curing the polymerizable material while in contact with said film, said polymerizable material consisting essentially of methyl methacrylate polymer and methyl methacrylate monomer mixed to a doughy consistency.

3. A method of producing an artificial tooth of polymerizable material which comprises: placing a film of polyethylene between a body of such polymerizable material and a forming surface having a contour to be imparted to the article, shaping the body of polymerizable material in contact with said film and to the contour of said surface, and curing the polymerizable material while in contact with said film, said polymerizable material consisting essentially of methyl methacrylate.

4. A method of producing an article of polymerizable material which comprises: placing a film of polyethylene between a body of such polymerizable material and a forming surface having a contour to be imparted to the article, shaping the body of polymerizable material in contact with said film and to the contour of said surface, and curing the polymerizable material while in contact with said film, said polymerizable material consisting essentially of a material from the group consisting of vinyl and methacrylate compounds.

ROY C. FEAGIN.

REFERENCES CITED

The following references are of record in the file of this patent:

UNITED STATES PATENTS

| Number | Name | Date |
|---|---|---|
| 2,067,580 | Rohm | Jan. 12, 1937 |

FOREIGN PATENTS

| Number | Country | Date |
|---|---|---|
| 484,343 | Great Britain | May 4, 1938 |